United States Patent [19]

Hashimoto et al.

[11] Patent Number: 4,658,417
[45] Date of Patent: Apr. 14, 1987

[54] INFORMATION TRANSMISSION/RECEPTION SYSTEM USING PUSHPHONE AND INFORMATION RECEPTION APPARATUS

[75] Inventors: Kazuo Hashimoto; Mitsuo Kobanawa, both of Tokyo, Japan

[73] Assignee: Hashimoto Corporation, Tokyo, Japan

[21] Appl. No.: 657,661

[22] Filed: Oct. 4, 1984

[30] Foreign Application Priority Data

Oct. 8, 1983 [JP] Japan .................................. 58-188732

[51] Int. Cl.$^4$ .......................................... H04M 11/00
[52] U.S. Cl. ...................................... 379/97; 379/100; 379/105
[58] Field of Search ...................... 179/2 A, 2 DP, 5.5, 179/84 C

[56] References Cited

U.S. PATENT DOCUMENTS

| 3,675,513 | 7/1972 | Flanagan et al. | 179/2 DP X |
| 4,051,326 | 9/1977 | Badagnani et al. | 179/2 DP |
| 4,095,050 | 6/1978 | Beachem et al. | 179/2 A |
| 4,191,854 | 3/1980 | Coles . | |
| 4,307,266 | 12/1981 | Messina | 179/2 DP |
| 4,345,113 | 8/1982 | Shelley | 179/2 A |
| 4,427,848 | 1/1984 | Tsakanikas | 179/2 DP |
| 4,540,851 | 9/1985 | Hashimoto | 179/2 A |
| 4,546,213 | 10/1985 | Dick | 179/2 A |
| 4,584,434 | 4/1986 | Hashimoto | 179/2 A |

FOREIGN PATENT DOCUMENTS

| 56-153874 | 11/1981 | Japan | 179/2 DP |
| 2100095 | 12/1982 | United Kingdom | 179/2 DP |

OTHER PUBLICATIONS

Sederholm et al., "Intelligent Telephone", IBM Technical Disclosure Bulletin, vol. 23, No. 9, Feb. 1981, pp. 4006-4008.
Pavlak et al., "KEYPAC-A Telephone Aid for the Deaf", IEEE Transactions on Communications, vol. Com-27, No. 9, Sep. 1979.

Primary Examiner—Keith E. George
Attorney, Agent, or Firm—Lowe Price Leblanc Becker & Shur

[57] ABSTRACT

Letters and a space are assigned to numeric keys of a pushphone. A desired numeral, letter or space is transmitted by depressing a corresponding numeric key a predetermined number of times, and thereafter a specific symbol key is depressed. At a reception side, a transmitted letter is detected in accordance with the corresponding numeric key code and the data representing the number of times of depression of the corresponding numeric key. An alphanumeric character string is thus displayed.

14 Claims, 7 Drawing Figures

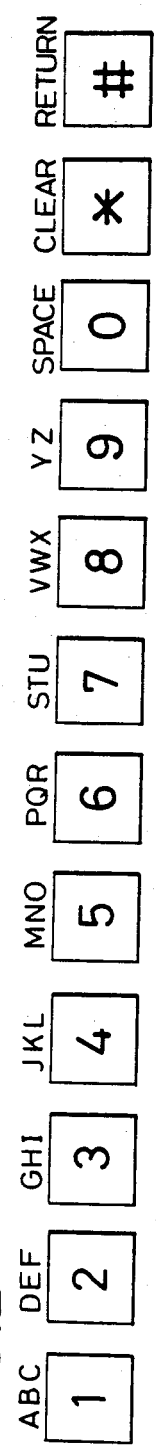
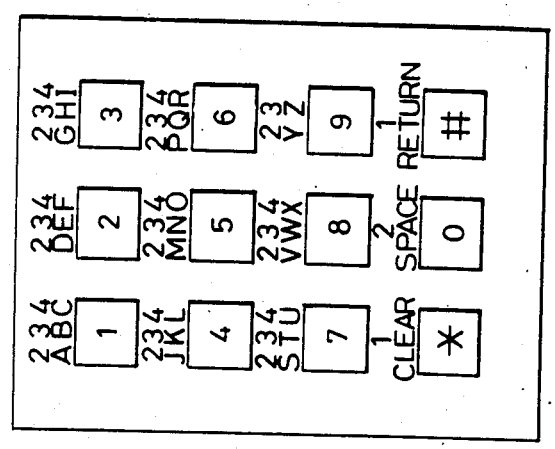
FIG.2
FIG.3
FIG.4

INFORMATION TRANSMISSION/RECEPTION SYSTEM USING PUSHPHONE AND INFORMATION RECEPTION APPARATUS

BACKGROUND OF THE INVENTION

The present invention relates to an information transmission system using a keyboard of a pushphone and, more particularly, to a system for transmitting alphanumeric sentences entered by the keyboard of the pushphone.

A conventional pushphone has a keyboard consisting of 12 keys. The 12 keys consist of 10 numeric keys 1 to 0 and two symbol keys * and #. In particular, in the mainland U.S.A., three letters are printed above or below a numeral on each numeric key (FIG. 4).

Telephone users often dial, for example, BN9348 in a local area in the United States, so that the above-mentioned keyboard input method has been preserved in telephone dialing.

According to the present invention, the keyboard format of the pushphone is positively used to transmit information sentences.

SUMMARY OF THE INVENTION

It is a first object of the present invention to provide an information transmission/reception system using a pushphone so as to trasmit/receive a sentence through a telephone circuit by using a keyboard of the pushphone.

It is a second object of the present invention to provide an information transmission/reception system using a pushphone so as to transmit/receive an alphanumeric sentence through a telephone circuit by using a keyboard of the pushphone.

It is a third object of the present invention to provide an information reception apparatus using a pushphone so as to store/display an alphanumeric sentence when information transmitted through a telephone circuit by using the keyboard of the pushphone is received.

In order to achieve the above objects of the present invention, there is provided an information transmission/reception system using a pushphone and an information reception apparatus, wherein 26 English letters and a space ar equally assigned to 10 numeric keys 1 to 10 of the pushphone, a desired letter is selected in accordance with a predetermined number of times of depressions of the keys, the respective numeric keys of the pushphone are selectively depressed after a loop circuit is formed, so that a letter and a space are selected in accordance with a predetermined number of times of depressions (e.g., one character is transmitted by depressing the symbol key #) and characters are thus sequentially sent to transmit an entire sentence; and the receiving side stores the depressed numerical key codes and the number of times of depressions of the numerical keys (e.g., when the code representing the symbol key # is sent, the information of the numerical key code and the number of times of depressions is discriminated to establish correspondence to one of the letter, numeral and space), and the numeral, letter and space are sequentially stored to display a character string consisting of the numerals, letters and characters on a display unit.

According to the present invention, a sentence consisting of alphanumeric characters can be easily transmitted/received to cause a user with deafness or other handicap to visibly recognize the sentence transmitted through the telephone circuit. In addition, the data to be stored can be transmitted/received by a telephone, so that the system according to the present invention can be used as a Teletype.

BRIEF DESCRIPTION OF THE DRAWINGS

FIG. 2 is a representation for explaining the relationship between the respective keys of the pushphone and the letters;

FIG. 3 is a representation showing an information sentence consisting of alphanumeric characters;

FIG. 4 is a representation showing an adapter mounted on a keyboard of a pushphone; and FIGS. 5-1 to 5-3 are respectively flow charts for explaining the operation of the embodiment of the present invention.

DETAILED DESCRIPTION OF THE PREFERRED EMBODIMENT

A preferred embodiment of the present invention will be described with reference to the accompanying drawings.

Figure 1:
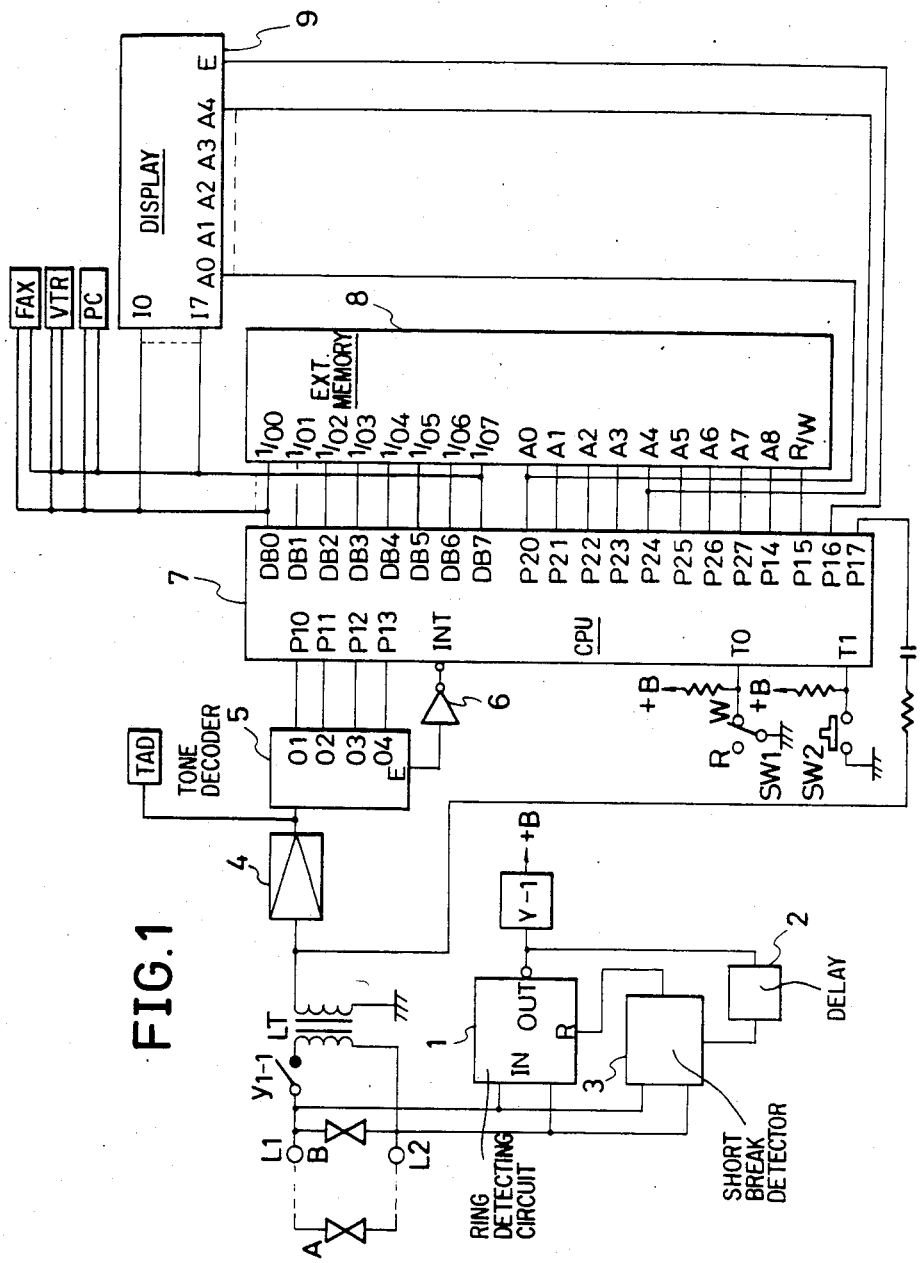
FIG. 1 is a circuit diagram of an embodiment of the present invention.

FIG. 1 is a circuit diagram of the embodiment according to the present invention. Reference symbol A denotes a pushphone at a calling party; L1 and L2, telephone lines; B, a telephone set at a called party; and LT, a line transformer. Reference numeral 1 denotes a ringing circuit for rendering a relay Y-1 as an engaging means of a load operative upon detecting a ringing signal. Reference numeral 2 denotes a delay circuit for delaying an input by about one second in response to an output from the ringing circuit 1. Reference numeral 3 denotes a short break detector for detecting that the calling party has hung up the phone; 4, an amplifier; 5, a tone decoder for converting a tone from the pushphone A to a binary output; 6, an inverter; and 7, a microprocessor (to be referred to as a CPU hereinafter). In this embodiment, the CPU 7 comprises, for example, a microprocessor 8748 or 8048. Reference numeral 8 denotes an external memory arranged outside the CPU 7. The external memory 8 comprises a RAM. The external memory 8 converts a code supplied from the pushphone A to an ASCII code to be described later. Reference numeral 9 denotes a 20-digit liquid crystal display device. Reference symbol SW1 denotes a switch. When the switch SW1 is set in the W position, the code from the pushphone A is converted to an ASCII code which is then stored in the external memory 8. However, when the switch SW1 is set at the R position, the code stored in the external memory 8 is displayed on the display device 9 since the switch SW1 is interlocked with a pushbutton switch SW2. When the switch SW1 is set in the R position, the pushbutton switch SW2 automatically displays data read from the external memory 8 at an address XX at a speed which allows the operator to visually read it. The pushbutton switch SW2 is also used to temporarily stop the display. When the pushbutton switch SW2 is depressed again, automatic display is restarted.

Figures 1, 5:
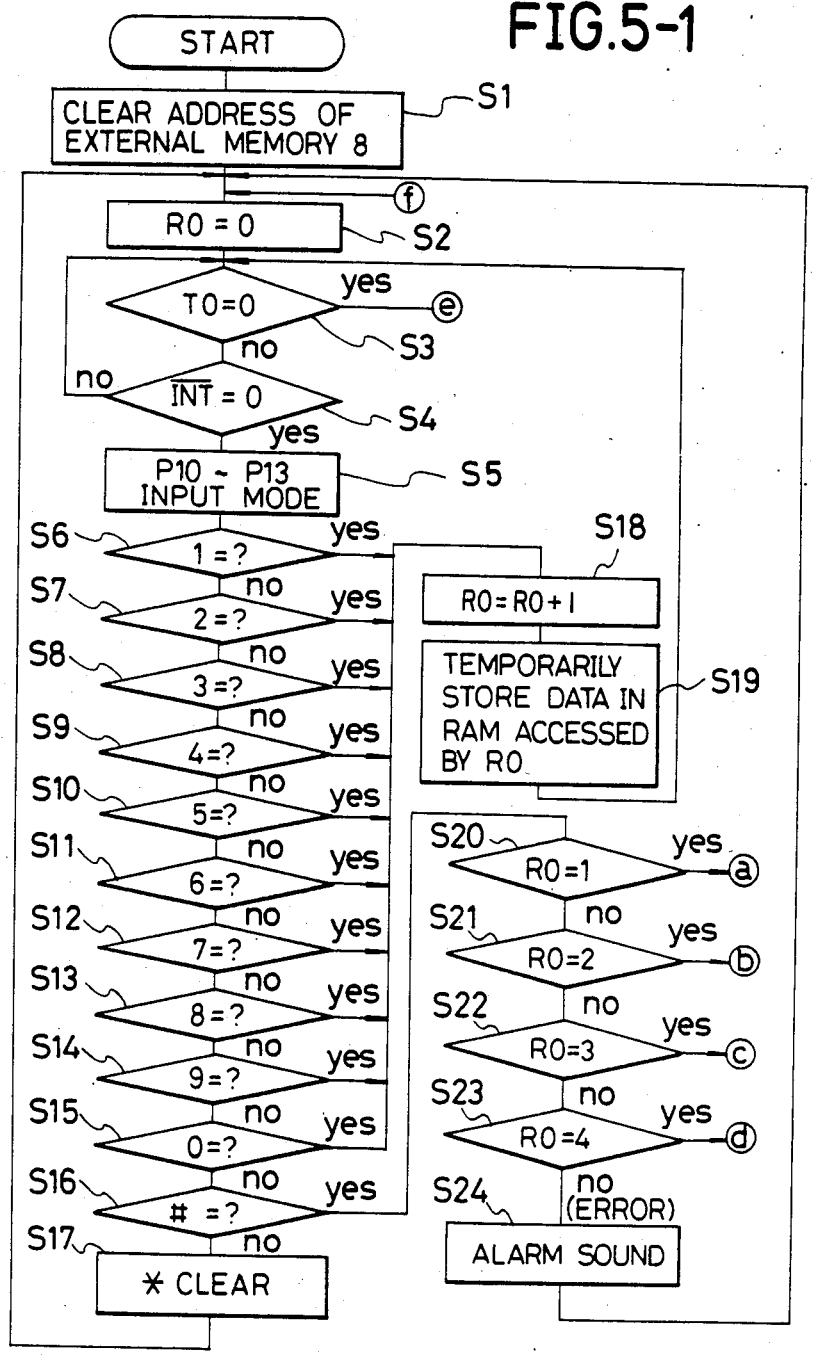
Figures 2, 5:
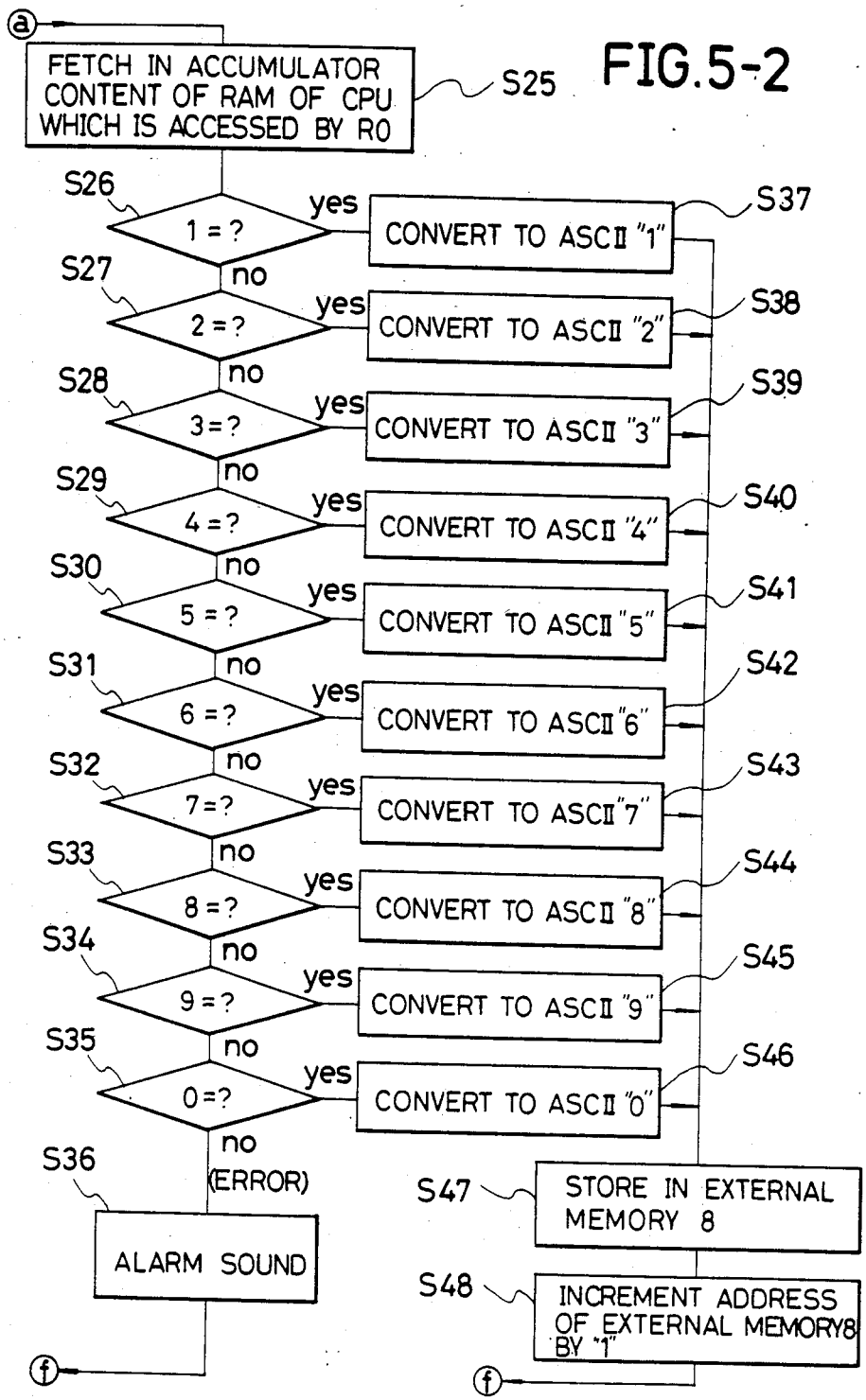

FIG. 2 shows the functions respectively assigned to the respective keys 1, 2, 3, 4, 5, 6, 7, 8, 9, 0, * and # of the pushphone A. More particularly, FIG. 2 shows the relationship between the number of times of key depressions and codes of letters or the like to be transmitted by given numbers of times of depressions. For example, when the "1" key is depressed once, a code representing numeral "1" is sent. When the "1" key is consecutively depressed twice, a code representing letter "A" is sent. When the "1" key is consecutively depressed three times, a code representing letter "B" is sent. When the "1" key is consecutively depressed four times, a code representing letter "C" is sent. Similarly, when a given key is depressed once, the numeral of symbol printed thereon is sent. When the given key is depressed twice, a code representing the left letter printed above the key is sent. When the given key is depressed three times, a code representing the central letter is sent. When the given key is depressed four times, a code representing the right letter is sent. The operation of this embodiment will be described with reference to flow charts in FIGS. 5-1 to 5-3.

When the information reception apparatus is set with the telephone set B and the switch SW1 is set in the W position, the CPU 7 clears an address for the external memory 8 (step S1). A register R0 in the CPU 7 is cleared (step S2). The CPU 7 checks in step S3 whether or not the input signal to a test terminal T0 is set at logic "0", i.e., the input signal is set at L level. Since the switch SW1 is set at the W position (i.e., the input signal is set at L level or logic "0"), the CPU 7 detects in step S4 whether or not an interrupt terminal INT is set at logic "0" (L level). If NO in step S4, the operation of step S3 is repeated, and the apparatus is set in the standby mode.

When the calling party calls the apparatus from the pushphone A, the ringing circuit 1 detects a ringing signal. The relay Y-1 as the engaging means of the load is energized, so that a loop is formed through its contact y1-1. As a result, the ringing signal is stopped. In this case, the loop may be formed through an automatic telephone answering apparatus 10 (shown in FIG. 1) to send an outgoing message and drive a recording tape 11 for recording an incoming message in response to this outgoing message from the calling party. The calling party uses the pushphone A after the loop is formed. For example, in order to send a code representing numeral "1" to the apparatus, the numeric key "1" of the pushphone A is depressed once and then the symbol key "#" is depressed once. In this case, a tone signal reaches the apparatus side through the telephone lines L1 and L2 and is amplified by the amplifier 4 through the line transformer LT. An amplified tone signal is then converted by the tone decoder 5 to binary data. The code representing the numeral "1" is produced such that output terminals 04, 03, 02 and 01 of the tone decoder 5 are set at L, L, L and H levels, respectively. When a predetermined period of time has elapsed after the output from the tone decoder 5 is stabilized, a terminal E of the tone decoder 5 goes to H level. The interrupt terminal INT of the CPU 7 is set at L level (logic "0") through the inverter 6, so that an interrupt operation is started. As shown in the flow chart of FIG. 5-1, when the terminal INT goes to logic "0" (L level) in step S4, input/output ports of the CPU 7 are set at the input mode in step S5. The output from the tone decoder 5 is fetched in an accumulator in the CPU 7. The accumulator tests if the code corresponds to one of the numerals from 1 to 9 and 0, and the symbols # and * in steps S6 to S17. When the code represents the numeral "1" in step S6, a count of the register R0 in the CPU 7 is incremented by one in step S18, so that the code representing the numeral "1" is stored in the RAM in the CPU 7 so as to correspond to the count of the register R0 in step S19. The operation of step S3 is repeated. When a code representing the symbol key "#" is sent, the code is fetched by the accumulator in the CPU 7, as described above. The code test in steps S6 to S16 is performed. When the code is detected to represent the symbol key "#" in step S16, the value of the register R0 is tested in steps S20 to S23. Before the code representing the symbol key "#" is sent, the code representing the numeral "1" is sent once. Therefore, as is apparent from the flow chart, the register R0=1 is determined in step S20. The flow chart in FIG. 5-2 is initiated through a node a. The content temporarily stored in the RAM within the CPU 7 and specified by the register R0 is stored in the accumulator. The accumulator performs the test of this content in steps S26 to S35 and converts the contents to the appropriate ASC11 codes at steps 537–546. In the above case, in step 26 it is determined that the code representing numeral "1" is stored in the accumulator, and the code is then converted to an ASCII code which is commonly used worldwide in step S37. The ASCII code is stored in the external memory 8 in step S47. Furthermore, at step S48 an address of the external memory 8 is incremented by one, and the flow returns to the operation after step S2 through a node f.

If the code stored in the accumulator does not correspond to any of the digits 0–9 and the tests of each of steps S26–S35 are failed, an alarm sound is generated at step S36 to indicate an error.

Figures 3, 5:
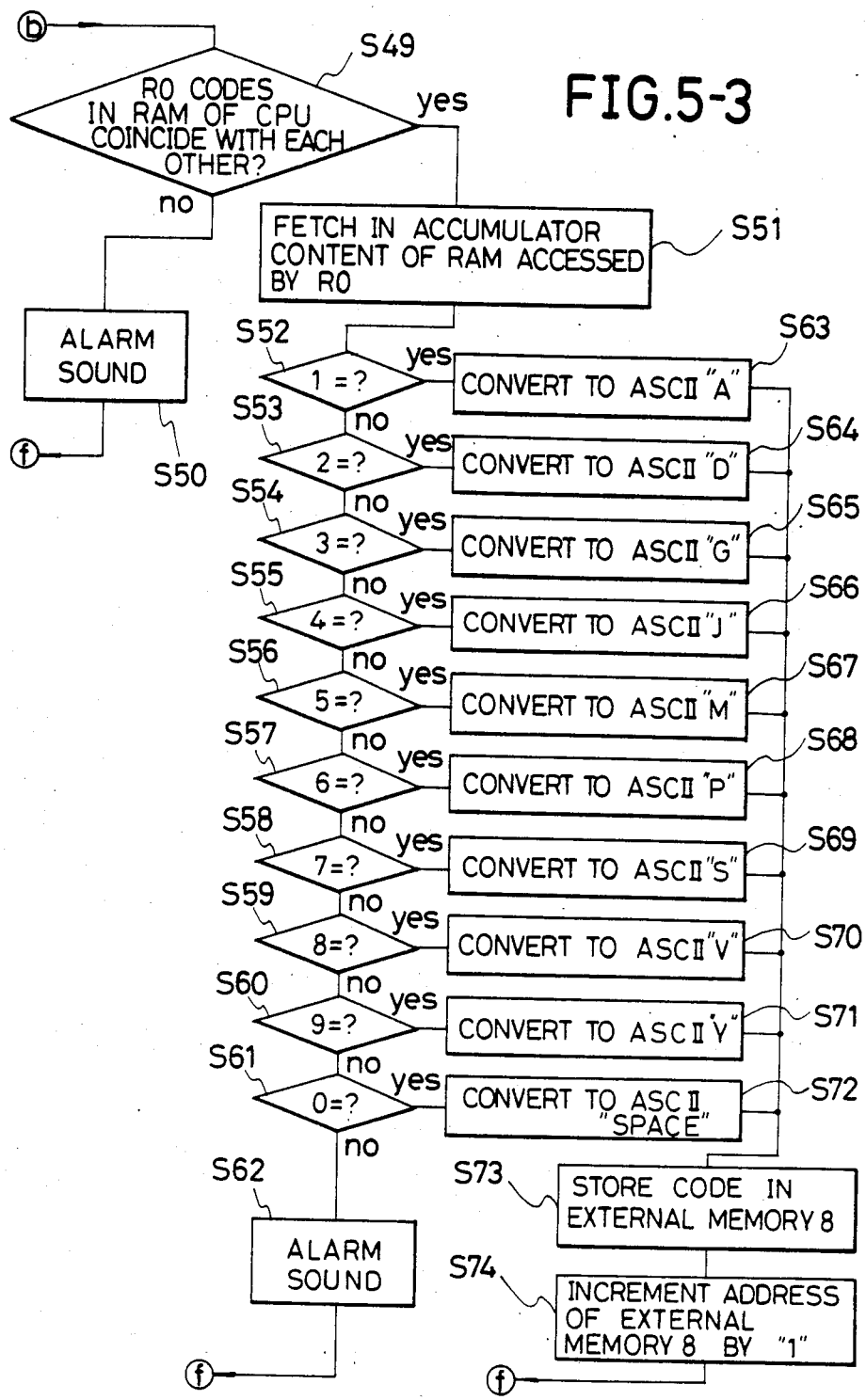

When the calling party wishes to send code "A", he depressed the numeric key "1" twice, and the symbol key "#" once. As shown in the flow chart in FIG. 5-1, the code representing the numeral "1" obtained upon depression of the numeric key "1" once is stored in the RAM of the CPU 7 which is accessed by R0=1 (steps S6, S18 and S19). When the pushbutton "1" is depressed again successively, the code representing the numeral "1" is stored in the RAM of the CPU 7 which is accessed by R0=2 (steps S6, S18 and S19). Furthermore, when the symbol key "#" is depressed and detected in step S16, the flow chart in FIG. 5-3 is initiated through a node b since the register R0=2 is established in step S21. When R0=1 and R0=2 are established, the CPU 7 checks whether or not the codes stored in the RAM in the CPU 7 coincide with each other in step S49. When the calling party erroneously depress the pushbuttons, the codes do not coincide with each other. An alarm sound is sent to the calling party so as to cause the calling party to reenter the codes in accordance with the program, in step S50. However, when the codes coincide with other, the codes in the internal RAM are fetched by the accumulator in step S51 and are tested in steps S52 to S61. In this case, the codes stored in the RAM represent the numeral "1" (step S52), so that the codes are coverted to the ASCII code "A", as shown in the flow chart (step S63). The ASCII code "A" is stored in the external memory 8 in step S73. The address of the external memory 8 is incremented by one in step S74, and the flow returns to the operation after step S2. The apparatus is ready for the next input code.

In order to send the code "B", the numeric key "1" of the pushphone is depressed three times, and the symbol key "#" is depressed once. In order to send the code "C", the numeric key "1" is depressed four times, and the symbol key "#" is depressed once. Programs for these operations are initiated at nodes c and d of FIG. 5-1 after detection that R0=3 or R0=4, respectively. These programs are initiated at node b, similar to the program described above, and a flow chart thereof is omitted. In the event that the value of R0 fails each of the tests at steps S20–S23, an error condition is detected and an alarm sound is generated at step S24. In order to send each of the codes "D" to "Z", the corresponding key is depressed a predetermined number of times, and the symbol key "#" is depressed once as shown in FIG. 2. The codes, tested in steps S53 to S61, are converted to the appropriate ASC11 codes as shown at steps S64–S71. In order to send the code "space", the numeric key "0" is depressed twice, and the symbol key "#" is depressed once. In this case, the value of the register R0 is set to be "2". Since the code representing the numeral "0" is temporarily stored in the RAM in the CPU 7, the CPU 7 performs steps S21, S41, S51 to S61 and S72 when the code key "#" is depressed in step S16. The code representing the numeral "0" is converted at step S72 to the ASCII code "space" which is then stored in the external memory 8. The code may be cleared by depressing the key "*". When the code representing the symbol key "*" is sent, the flow returns to step S2, and the register R0 is cleared. Even if the register R0 is started and the codes are stored in the RAM in the CPU, these codes become invalid, so that the next code is stored. As shown in FIG. 5-3, if the code in the internal RAM does not correspond to any of the codes which can be output by the pushphone and fails each of the tests in steps S52 to S61, an alarm sound is generated in step S62.

When transmission of a predetermined code (a numeral or character) is ended and the calling party hangs up the pushphone A, a hang-up signal is detected by the short break detector 3, and the ringing circuit 1 is reset. The relay Y-1 is reset to set the apparatus in the standby mode. When a period "." is stored after the code in the external memory 8, a series of code segmentation can be performed. It is convenient to use a plastic adapter with holes fitted with the respective keys of the pushphone A having the letters A to Z thereon. Numerals printed above the letters A to Z represent the numbers of times of depressions.

In order to display a code stored in the external memory 8 on the display unit 9, the switch SW1 is set in the R position (the operation is known to those skilled in the art, and a flow chart therefor is omitted). The result is displayed, as shown in FIG. 3. A number "1-" indicates the order of incoming calls. This can be achieved by using a register R1 for counting the number of incoming calls.

According to the present invention, an alphanumeric sentence can be transmitted. When the called party is absent, and the calling party records his voice in the incoming message tape in the automatic telephone answering apparatus, the incoming message is recorded on the tape and then decoded later to visually display the incoming call on the display unit for a subscriber suffering from deafness or other incapacity. In a personal computer, a facsimile system or a VTR which can be controlled through a public telephone line, an incoming call is received by the automatic telephone answering apparatus. Thereafter, when the facsimile system is started, a character code "F-A-X" is sent to the called party. When the VTR is started, a character code "V-T-R" is sent to the called party. When the personal computer is started, a character code "P-A-S" is sent to the called party. Any type of equipment can be selected and can be operated. In other words, such equipment can be used as a simple teletype.

What is claimed is:

1. An information communication system including a reception apparatus comprising:
   a ringing circuit for detecting a ringing signal of a telephone set; looping means for forming a loop in response to an output from said ringing circuit; a tone decoder for converting to a code a tone sent upon depression of each key of a remote pushphone; numeric key code discriminating means for discriminating a code of one of a plurality of numeric keys representing numerals from 1 to 0 of the pushphone in response to an output from said tone decoder; memory means for storing a discriminated numeric key code and data representing a number of times of receptions thereof; second discriminating means for discriminating among letters and numbers on the basis of the numeric key code and the data representing the number of times of receptions thereof which are stored in said memory means upon reception of a specific symbol key code following the numeric key code; said second discriminating means including means for discriminating among a plurality of letters represented by a single numeric key code and for detecting the numeric key code as representing a letter in a $k^{th}$ ordinal position associated with a particular key which generated said key code by determining that the number of receptions of the key code is $k+1$; code memory means for storing a letter code for each letter discriminated by said second discriminating means; and display means for displaying a character string stored in said code memory means;
   said system further including adapter means for mounting on a keypad of the pushphone and including indicating means for indicating a number of depressions of each key required to transmit each letter.

2. A system according to claim 1, wherein the specific symbol key code comprises a code generated upon depression of a symbol key "#".

3. A system according to claim 2, the reception apparatus further comprising clearing means for clearing the numeric key code and the data representing the number of times of receptions thereof when a code representing another symbol key "*" on the pushphone is received before the specific symbol key code is received.

4. A system according to claim 1, wherein said reception apparatus is connected to an automatic telephone answering device.

5. A system according to claim 1, said adapter further comprising function identifying means for a subset of keys of the keypad together with depression number indicating means corresponding to each of the function identifying means for identifying a number of depressions of each key of said subset for transmitting a function identified by said function identifying means.

6. A system according to claim 1 wherein said indicating means includes a numerical indicia adjacent a letter identifying indicium in a $k^{th}$ ordinal position associated with a key, said numerical indicia being one more than k, wherein numbers are discriminated upon one reception of a numeric key code followed by the specific symbol key code.

7. A system according to claim 6 wherein said adapter means includes a plurality of openings for the keys of the keypad and wherein said letter identifying indicum and the indicating means therefor are provided adjacent the opening for the key used to transmit the letter.

8. A system according to claim 1, said reception apparatus further comprising alarm generating means indicative of error.

9. A system according to claim 8 wherein said alarm generating means comprises first alarm generator for generating an alarm when the data stored in said memory means representing the number of receptions of a numeric key code is outside a predetermined range.

10. A system according to claim 9 wherein said alarm generating means comprises second alarm generator for generating an alarm when the numeric key code stored in said memory means does not correspond to one of a predetermined set of codes.

11. A system according to claim 8 wherein said alarm generating means comprises an alarm generator for generating an alarm when the numeric key code stored in said memory means does not correspond to one of a predetermined set of codes.

12. A system as recited in claim 1, said reception apparatus further comprising a telephone answering device connected thereto and connected to be responsive to said ringing circuit and further connected to said looping means thereby to provide for communication by transmission of alphanumeric messages or by recording received information in the telephone answering device.

13. A system as recited in claim 12, said reception apparatus further comprising means for transmitting predetermined codes for identifying a device activated by the communication.

14. A system as recited in claim 13 wherein
said means for transmitting predetermined codes comprises means for sending a first character code to identify starting of a facsimile system;
means for sending a second character code to identify starting of a video tape recorder, and means for sending a third character code to identify starting of a personal computer or the like.

* * * * *